United States Patent
Kang et al.

(10) Patent No.: US 9,865,877 B2
(45) Date of Patent: Jan. 9, 2018

(54) METHOD FOR PREPARING POLYANION-CARBON NANOFIBER COMPOSITE CATHODE ACTIVE MATERIAL

(71) Applicant: Dongguk University Industry-Academic Cooperation Foundation, Seoul (KR)

(72) Inventors: Yong-Mook Kang, Seoul (KR); Jung-Hoon Yang, Seoul (KR)

(*) Notice: Subject to any disclaimer, the term of this patent is extended or adjusted under 35 U.S.C. 154(b) by 0 days.

(21) Appl. No.: 14/735,096

(22) Filed: Jun. 9, 2015

(65) Prior Publication Data

US 2016/0156019 A1   Jun. 2, 2016

(30) Foreign Application Priority Data

Dec. 2, 2014 (KR) .................. 10-2014-0170803

(51) Int. Cl.
  H01M 4/583 (2010.01)
  H01M 4/58 (2010.01)
  H01M 4/36 (2006.01)
  H01M 4/587 (2010.01)

(52) U.S. Cl.
  CPC ......... *H01M 4/5825* (2013.01); *H01M 4/364* (2013.01); *H01M 4/587* (2013.01)

(58) Field of Classification Search
  CPC .... H01M 4/587; H01M 4/625; H01M 4/5825; H01M 4/583; B82Y 30/00
  USPC ................ 252/500–519.1; 977/762, 788
  See application file for complete search history.

(56) References Cited

PUBLICATIONS

Li ("Budding willow branches shaped Na3V2(PO4)3/C nanofibers synthesized via an electrospinning technique and used as cathode material for sodium ion batteries." JPS, 273, pp. 784-792, pub Oct. 2, 2014).*
Yang JMC A ("Na3V2(PO4)3 particles partly embedded in carbon nanofibers with superb kinetics for ultra-high power sodium ion batteries." JMC A, 3, pp. 1005-1009, pub Nov. 18, 2014).*
Wei ("One-pot synthesized bicontinuous hierarchical Li3V2(PO4)3/C mesoporous nanowires for high-rate and ultralong-life lithium-ion batteries." Nanoletters, 14, pp. 1042-1048, pub Jan. 17, 2014).*
Rui ("Li3V2(PO4)3 nanocrystals embedded in a nanoporous carbon matrix supported on reduced graphene oxide sheets: Binder-free and high rate cathode material for lithium-ion batteries." JPS, 214, pp. 171-177, pub May 2012).*
Zhang ("Porous Li3V2(PO4)3/C cathode with extremely high-rate capacity prepared by a sol-gel-combustion method for fast charging and discharging." JPS, 203, pp. 121-125, pub Dec. 8, 2011).*
Na3V2(PO4)3 Particles Partly Embedded in Carbon Nanofibers with superb kinetics for ultra-high power sodium ion battery, Jun. 10, 2014-Jun. 14, 2014, Como Italy.

* cited by examiner

*Primary Examiner* — Tri V Nguyen
(74) *Attorney, Agent, or Firm* — Antonio Ha & U.S. Patent, LLC

(57) ABSTRACT

According to an embodiment of the present disclosure, a multi-acid anionic material-carbon fiber composite comprises carbon nanofibers and multi-acid anionic crystals stuck in the carbon nanofibers. Some of the multi-acid anionic crystals are exposed to an outside of the carbon nanofibers.

1 Claim, 7 Drawing Sheets

METHOD FOR PREPARING POLYANION-CARBON NANOFIBER COMPOSITE CATHODE ACTIVE MATERIAL

CROSS-REFERENCE TO RELATED APPLICATIONS

This patent application claims priority under 35 U.S.C. §119 to Korean Patent Application No. 10-2014-0170803, filed on Dec. 2, 2014, in the Korean intellectual Property Office, the disclosure of which is incorporated by reference herein in its entirety.

TECHNICAL FIELD

Embodiments of the present disclosure are directed to polyanion-carbon nanofiber composite cathode active materials for ion batteries and methods for preparing the same, and more specifically, sodium vanadium phosphate/carbon fiber composites and methods for preparing the same through electrospinning and thermal treatment.

DISCUSSION OF RELATED ART

As applications in the secondary battery market recently depart from small portable electronics and demand for mid- or large-sized secondary batteries for, e.g., hybrid vehicles, is predicted to sharply grow, next-generation secondary batteries require enhanced characteristics, such as increased energy density and output. Further, as the secondary batteries become bulky, innovations in price are required as well.

Lithium ion batteries being currently used most frequently are limited in theoretical energy density to 250 Wh/kg and their price has been steadily increasing since lithium ion batteries were developed. Accordingly, research and development is underway for sodium secondary batteries with good price competitiveness, which are expected to adopt the techniques that have been used in lithium ion batteries.

However, sodium ions exhibit low mobility in the crystal structure of an electrode material, which may be an obstacle to figuring out the characteristics of the electrode material. Accordingly, it is crucial to discover materials with a proper crystal structure that may be used as an electrode material.

Na Super ionic CONductor (NASICON) has a channel through which sodium ions may travel in the three-dimensional crystal structure and shows a high sodium-ion mobility. In particular, there is ongoing vigorous research on application of vanadium-based $Na_3V_2(PO_4)_3$ to sodium ion batteries.

However, the material has limited characteristics in actually applying to electrode materials due to low electronic conductivity of phosphate-based materials and the microscale size of particles synthesized by the solid-state reaction. Therefore, a need exists for research on materials that may address the above issues.

SUMMARY

An embodiment of the present disclosure provides a sodium vanadium phosphate/carbon nanofiber composite with increased ionic/electronic conductivity, charge/discharge characteristics, and lifecycle, which may be used as an anion active material for sodium ion batteries.

An embodiment of the present disclosure provides a method for preparing a sodium vanadium phosphate/carbon nanofiber composite.

An embodiment of the present disclosure provides an anion active material containing a sodium vanadium phosphate/carbon nanofiber composite and a sodium ion battery including the anion active material.

According to an embodiment of the present disclosure, a multi-acid anionic material-carbon fiber composite comprises carbon nanofibers and multi-acid anionic crystals stuck in the carbon nanofibers. Some of the multi-acid anionic crystals may be exposed to an outside of the carbon nanofibers. The multi-acid anionic crystals may include sodium vanadium phosphate crystals. 5 to 20 parts by weight of the carbon nanofibers may be included relative to 100 parts by weight of the multi-acid anionic crystals.

According to an embodiment of the present disclosure, a cathode active material includes the multi-acid anionic material-carbon fiber composite.

According to an embodiment of the present disclosure, a sodium ion battery includes the cathode active material.

According to an embodiment of the present disclosure, a method for preparing a multi-acid anionic material-carbon fiber composite comprises preparing a first mixed solution including a vanadium precursor, a sodium precursor, a phosphate precursor, an organic acid, and distilled water, preparing a second mixed solution by mixing the first mixed solution with a carbon precursor solution, electrospinning the second mixed solution to obtain sodium vanadium phosphate precursor-polymer nanofibers, and calcining the nanofibers.

The vanadium precursor may be dissolved at 50° C. to 80° C. in an organic acid solution including the organic acid and the distilled water, and then, the sodium precursor and the phosphate precursor may be added and dissolved at 50° C. to 80° C.

The nanofibers may be calcined in an inert gas atmosphere. The nanofibers may be calcined at 600° C. to 900° C. The nanofibers may be calcined for four hours to seven hours. The vanadium precursor may include ammonium metavanadate, vanadium pentoxide, vanadium trioxide, or vanadyl acetylacetonate. 5 to 30 parts by weight of the vanadium precursor may be included respective of 100 parts by weight of the distilled water. The sodium precursor may include sodium acetate, sodium carbonate, or sodium hydroxide. 7 to 45 parts by weight of the sodium precursor may be included respective of 100 parts by weight of the distilled water. The phosphate precursor may include ammonium dihydrogen phosphate, phosphoric acid, or ammonium phosphate. 5 to 30 parts by weight of the phosphate precursor may be included respective of 100 parts by weight of the distilled water. The organic acid may include citric acid, oxalic acid, or adipic acid. 10 to 45 parts by weight, of the organic acid may be included respective of 100 parts by weight of the distilled water. The carbon precursor may include polyvinylpyrrolidone, polyethylene, polyethyleneoxide, polyvinylalcohol, or polymethylmethacrylate. 65 to 100 parts by weight of the carbon precursor solution may be included respective of 100 parts by weight of the first mixed solution.

According to an embodiment of the present disclosure, a sodium vanadium phosphate precursor-polymer nanofiber composite is prepared by the method.

According to an embodiment of the present disclosure, a cathode active material includes the sodium vanadium phosphate precursor-polymer nanofiber composite.

According to an embodiment of the present disclosure, a sodium ion battery includes the cathode active material.

According to an embodiment of the present disclosure, a multi-acid anionic material-carbon fiber composite prepared by a method for preparing a multi-acid anionic material-carbon fiber composite may have enhanced electrochemical characteristics.

According to an embodiment of the present disclosure, a multi-acid anionic material-carbon fiber composite has carbon fibers with multi-acid anionic materials therein and thus may have higher ionic and electronic conductivity.

According to an embodiment of the present disclosure, a multi-acid anionic material-carbon fiber composite prepared by a method for preparing a multi-acid anionic material-carbon fiber composite may have excellent charge/discharge characteristics and increased lifecycle as a cathode active material for sodium ion batteries.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EMBODIMENTS

Figure 1:
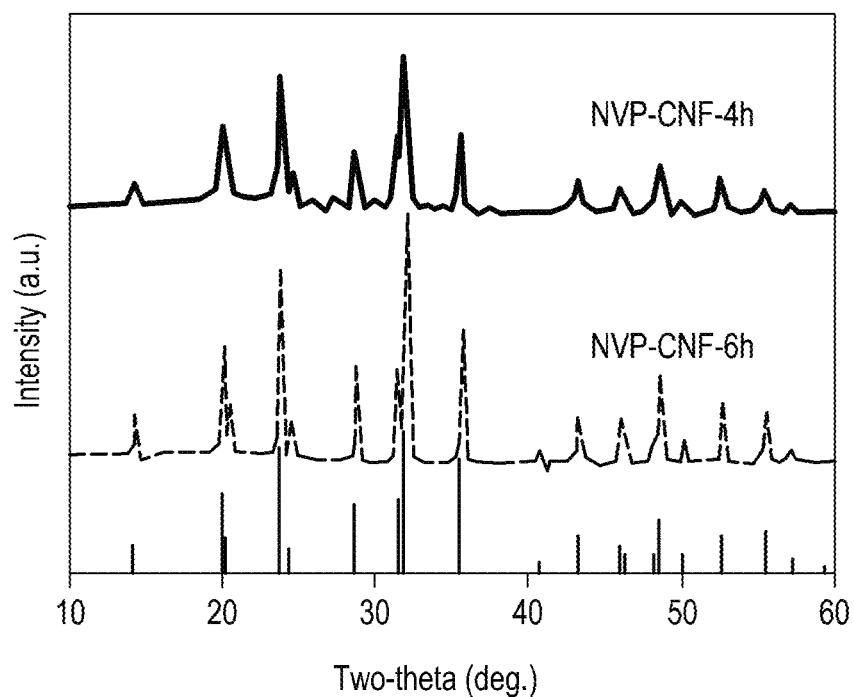
FIG. 1 is a graph illustrating a result of X-ray diffraction analysis on a multi-acid anionic material-carbon fiber composite prepared by a preparing method according to an embodiment of the present disclosure.

Hereinafter, exemplary embodiments of the inventive concept will be described in detail with reference to the accompanying drawings. The inventive concept, however, may be modified in various different ways, and should not be construed as limited to the embodiments set forth herein. As used herein, the singular forms "a," "an," and "the" are intended to include the plural forms as well, unless the context clearly indicates otherwise.

According to an embodiment of the present disclosure, there are provided a multi-acid anionic material-carbon fiber composite in which carbon nanofibers and multi-acid anionic crystals stuck into the carbon nanofibers, and some of the multi-acid anionic crystals are exposed to the outside of the carbon nanofibers.

The multi-acid anionic crystals may include sodium vanadium phosphate crystals.

Multi-acid anions are materials with a negative charge of −2 or more. According to an embodiment of the present disclosure, the multi-acid anions may include phosphate ions.

For example, the multi-acid anionic material-carbon fiber composite may include 5 to 20 parts by weight of the carbon fibers relative to 100 parts by weight of the multi-acid anionic materials.

The multi-acid anionic material-carbon fiber composite, when containing more multi-acid anionic materials as compared with the weight ratio, may exhibit reduced electronic conductivity, and when containing a trace amount of multi-acid anionic materials, may present a reduced capacity due to a reduction in the amount of materials in the multi-acid anionic material-carbon fiber composite.

The multi-acid anionic material-carbon fiber composite has the structure that some of the multi-acid anionic crystals are exposed to the outside of the carbon nanofibers, and thus, does not experience interference with the movement of sodium ions from the electrolyte to the multi-acid anionic crystals, thus increasing ionic conductivity. The multi-acid anionic material-carbon fiber composite is based on carbon nanofibers and thus may increase electronic conductivity that is low in materials containing a phosphate group.

According to an embodiment of the present disclosure, there are provided a cathode active material including the multi-acid anionic material-carbon fiber composite and a sodium ion battery including the cathode active material.

According to an embodiment of the present disclosure, a method for preparing a multi-acid anionic material-carbon fiber composite includes preparing a first mixed solution including a vanadium precursor, a sodium precursor, a phosphate precursor, an organic acid, and distilled water (step 1), preparing a second mixed solution by mixing the first mixed solution with a carbon precursor solution (step 2), electrospinning the second mixed solution to obtain sodium vanadium phosphate precursor-polymer nanofibers (step 3), and calcining the nanofibers (step 4).

Prepared in step 1 is the first mixed solution including the vanadium precursor, the sodium precursor, the phosphate precursor, and the organic acid.

In step 1, the vanadium precursor may be dissolved at 50° C. to 80° C. in an organic acid solution, and then, the sodium precursor and the phosphate precursor may be added and dissolved at 50° C. to 80° C.

In step 1, the dissolution may be performed at 60° C., for example. When the temperature of the dissolution is less than 50° C., the vanadium precursor and the organic acid might not get through smooth chelating reaction, and after finally synthesized, not sodium vanadium phosphate phases but impurities may be created. When the temperature of the dissolution is more than 80° C., the distilled water that serves as a solvent may be vaporized, resulting in a reduction in volume. Accordingly, the viscosity may be varied upon electrospinning.

The organic acid may include, but is not limited to, citric acid, oxalic acid, or adipic acid, 10 to 45 parts by weight of the organic acid may be included relative to 100 parts by weight of the distilled water. When the amount of organic acid is less than 10 parts by weight, no chelating reaction occurs between the vanadium precursor and the organic acid, so that, after finally synthesized, not sodium vanadium phosphate phases but impurities may be created, and when the amount of organic acid is more than 45 parts by weight, a variation in pH occurs, rendering it difficult to prepare a homogenized solution.

The vanadium precursor may include, but is not limited to, ammonium metavandate, vanadium pentoxide, vanadium trioxide, or vanadyl acetylacetonate.

5 to 30 parts by weight of the vanadium precursor may be included relative to 100 parts by weight of the distilled water. When the amount of the vanadium precursor included is less than 5 parts by weight, the weight ratio relative to the carbon precursor is reduced, and thus, after synthesized, the sodium vanadium phosphate ends up being present in thick nanofibers, deteriorating electrochemical characteristics. When the amount of the vanadium precursor included is more than 30 parts by weight, the remaining vanadium precursor that does not attend the chelating reaction with the organic acid may create impurities.

the sodium precursor may include, but is not limited to, sodium acetate, sodium carbonate, or sodium hydroxide.

7 to 45 parts by weight of the sodium precursor may be included relative to 100 parts by weight of the distilled water. When the amount of the sodium precursor included is less than 7 parts by weight, the weight ratio relative to the carbon precursor is reduced, so that, after synthesized, the sodium vanadium phosphate ends up being present in thick nanofibers, thus deteriorating electrochemical characteristics. When the amount of the sodium precursor included is more than 45 parts by weight, the sodium precursor might not be completely dissolved in the solution.

The phosphate precursor may include, but is not limited to, ammonium dihydrogen phosphate, phosphoric acid, or ammonium phosphate.

5 to 30 parts by weight of the phosphate precursor may be included relative to 100 parts by weight of the distilled water. When the amount of the phosphate precursor included is less than 5 parts by weight, the weight ratio relative to the carbon precursor is reduced, so that, after synthesized, the sodium vanadium phosphate ends up being present in thick nanofibers, deteriorating electrochemical characteristics. When the amount of the phosphate precursor included is more than 30 parts by weight, the phosphate precursor might not be completely dissolved in the solution.

In step 2, the prepared first mixed solution is mixed with a carbon precursor solution to prepare a homogenized second mixed solution.

The ratio in weight of the first mixed solution to the carbon precursor solution may be 50:50 to 60:40. For example, 200 to 300 parts by weight of the carbon precursor may be mixed relative to 100 parts by weight of the vanadium precursor.

The carbon precursor may include, but is not limited to, polyvinylpyrrolidone, Polyethylene, polyethyleneoxide, polyvinylachohol, or polymethylmethacrylate.

The carbon precursor solution may contain 25 to 33 parts by weight of the carbon precursor relative to 100 parts by weight of the distilled water. When the amount of the carbon precursor included is less than 25 parts by weight, the mixed solution may present a viscosity that is not appropriate for electrospinning, resulting in failure of electrospinning. Thus, not nanofibers but powder-type shapes may be produced. When the amount of the carbon precursor included is more than 33 parts by weight, the nanofibers may be too thickened, and the mixed solution may be hardened upon electrospinning, thus interfering with electrospinning.

In step 3, the second mixed solution is electrospun into nanofibers.

In the electrospinning process, the size of nanofibers prepared may be adjusted depending on the size of the needle used, voltage applied, and the speed of the pump pumping the solution. For example, the size of the needle may be 15 to 30 gauges, the voltage 10 to 25 kV, the pump speed 0.2 to 0.6 ml, and the distance between the needle and the aluminum foil 5 to 20 cm, but embodiments of the present disclosure are not limited thereto.

In step 4, the nanofibers obtained by the electrospinning are calcined.

The calcination of the nanofibers may be performed in an inert gas atmosphere. The insert gas may include, e.g., argon (Ar).

The calcination of the nanofibers may be performed at 600° C. to 900° C. For example, the temperature of calcination may be from 700° C. to 800° C.

When the temperature of calcination is less than 600° C., the crystallinity of sodium vanadium phosphate may be reduced, and the carbon nanofibers created after calcination may be too thickened, thus deteriorating electrochemical characteristics. When the temperature of calcination is more than 900° C. the sodium vanadium phosphate may present increased particle sizes and lose nanofiber shapes.

The calcination of the nanofibers may be performed for four hours to seven hours. For example, the nanofibers may be calcined for six hours.

When the time of the calcination is less than four hours, amorphous carbon nanofibers and multi-acid anionic crystals may simultaneously be present in one-dimensional nanofibers, the diameter of the nanofibers may be increased, and the mobility of sodium ions may be hindered by carbon materials, thus deteriorating characteristics as cathode materials for sodium ion batteries.

When the time of calcination is more than seven hours, more energy may be consumed for obtaining the same product, thus increasing manufacturing costs. Further, the sodium vanadium phosphate may have increased particle sizes and lose nanofiber shapes.

In the multi-acid anionic material-carbon fiber composite prepared by the preparing method described above, particles of multi-acid anionic materials (sodium vanadium phosphate) may be stuck into carbon nanofibers.

Such structure may compensate for low electronic conductivity of multi-acid anionic materials through a carbon nanofiber mesh. Some of the multi-acid anionic materials are protruded to the outside of the carbon nanofiber mesh. Accordingly, the high sodium ion concentration of the NASICON structure is not hindered by the carbon materials. Therefore, increased electronic conductivity and sodium ion mobility may be obtained.

Accordingly, the multi-acid anionic material-carbon fiber composite prepared by the preparing method according to an embodiment of the present disclosure may enhance low electronic conductivity of a material and present enhanced electrochemical characteristics. Thus, the multi-acid anionic material-carbon fiber composite may be used as an electrode material for sodium ion batteries.

Embodiment 1: Preparation of Multi-Acid Anionic Material-Carbon Fiber Composite

Citric acid is dissolved in distilled water to prepare a citric acid solution of 14 wt %. 0.57 g of metavanadate is added and dissolved at ° C. in the prepared citric acid solution of 50 ml. 0.84 g of sodium acetate and 0.5995 g of ammonium dihydrogen phosphate are added and stirred at 60° C., preparing a homogenized mixed solution.

7 g of the prepared mixed solution is added and stirred in 5 g of a 20 wt % polyvinyl pyrrolidone solution, preparing a sodium vanadium phosphate precursor-polymer mixed solution.

The prepared mixed solution is electrospun to prepare nanofibers. Upon electrospinning, the speed at which the solution is pumped, voltage, and the thickness of the needle are 0.3 ml, 20 kV, and 27 gauges, respectively.

The composite nanofibers prepared through the electrospinning are calcined at 800° C. in an inert gas atmosphere for six hours, preparing a multi-acid anionic material-carbon fiber composite.

Embodiment 2: Preparation of Multi-Acid Anionic Material-Carbon Fiber Composite Substantially the same preparing method as in embodiment 1 is used except that in embodiment 2 the calcination is performed for four hours to prepare a multi-acid anionic material-carbon fiber composite.

Experimental Example 1: X-ray Diffraction Analysis

X-ray diffraction analysis was conducted on the multi-acid anionic material-carbon fiber composites prepared as in embodiment 1 and embodiment 2, and results were shown in FIG. 1.

As evident from the X-ray diffraction analysis result of FIG. 1, the X-ray diffraction peak for the multi-acid anionic material crystals in the multi-acid anionic material-carbon fiber composite was shown to be sharper in embodiment 1 where the calcination was performed for six hours than in embodiment 2 where the calcination was performed for four hours. Accordingly, it may be identified that the crystallinity was increased when the calcination was performed for six hours as compared with when the calcination was performed for four hours.

No carbon nanofibers were shown in the X-ray diffraction analysis results due to low crystallinity of carbon nanofibers.

Experimental Example 2: Scan Electron Microscopy and Transmission Electron Microscopy Analysis Scan electron microscopy and transmission electron microscopy analysis was conducted on the multi-acid anionic material-carbon fiber composites prepared as in embodiment 1 and embodiment 2, and results were shown in FIG. 2A and FIG. 2B.

Figure 2A:
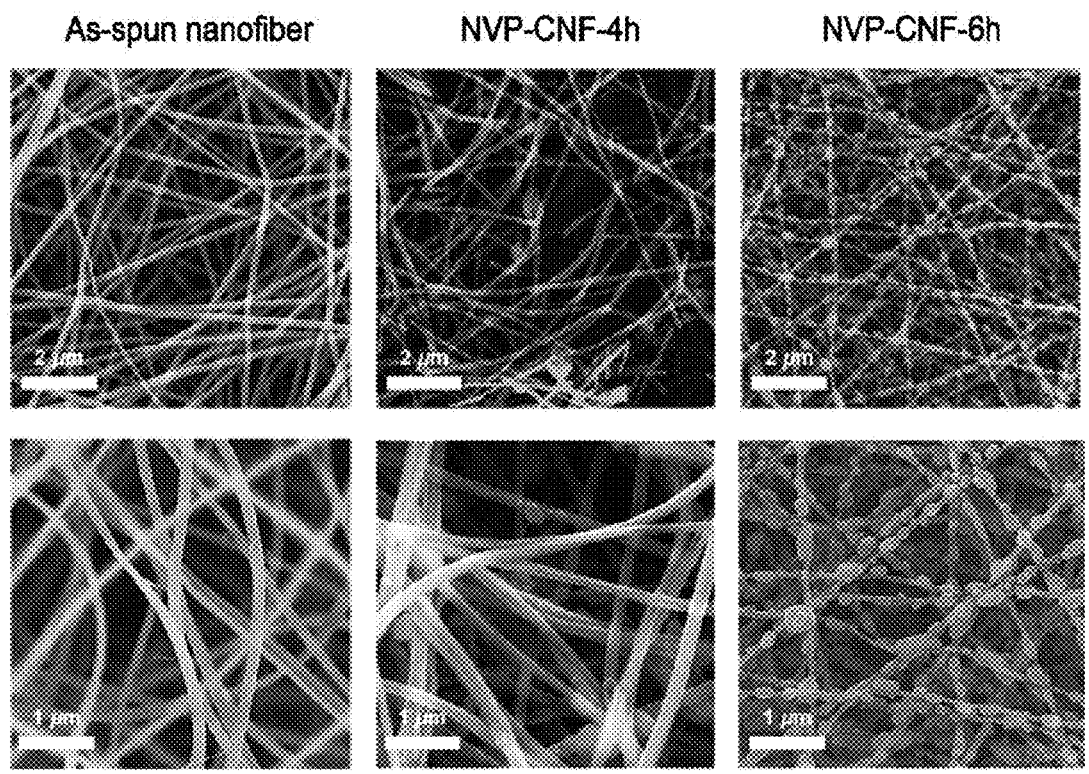
FIG. 2A is a view illustrating a result of scanning microscopy analysis on a multi-acid anionic material-carbon fiber composite prepared by a preparing method according to an embodiment of the present disclosure.

As evident from the scan electron microscopy analysis result of FIG. 2A, the multi-acid anionic material-carbon fiber composite prepared through electrospinning has a one-dimensional nanofiber structure.

The multi-acid anionic material-carbon fiber composite that was obtained through four hours of calcination as in embodiment 2 maintained a one-dimensional nanofiber structure. As evident from the result of the scan electron microscopy analysis on the multi-acid anionic material-carbon fiber composite obtained through six hours of calcination as embodiment 1, multi-acid anionic material particles were stuck into the carbon nanofibers.

Figure 2B:
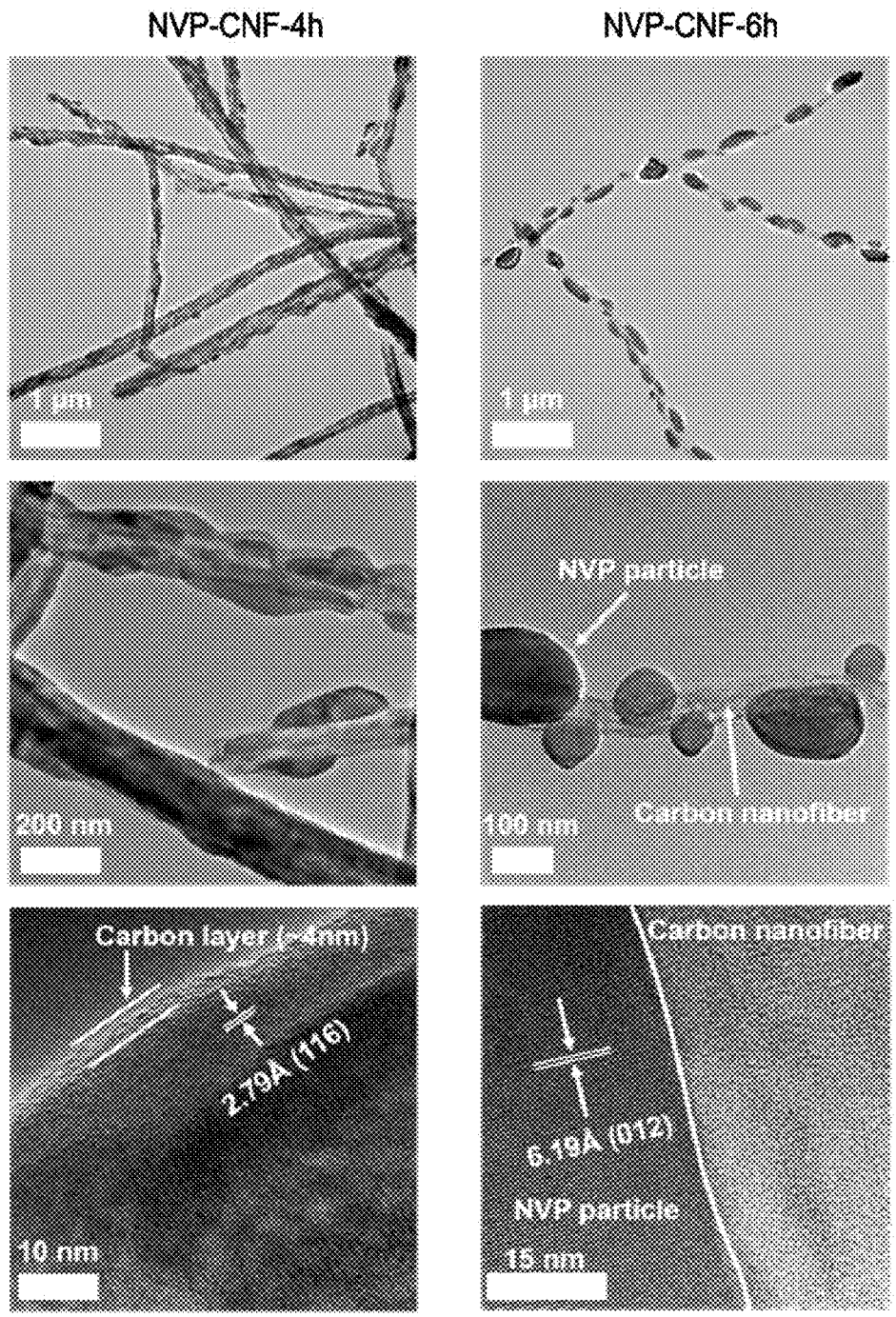
FIG. 2B is a view illustrating a result of transmission electron microscopy analysis on a multi-acid anionic material-carbon fiber composite prepared by a preparing method according to an embodiment of the present disclosure.

From the transmission electron microscopy analysis result of FIG. 2B, highly magnified shapes of the structure of the multi-acid anionic material-carbon fiber composites prepared in embodiment 1 and embodiment 2 could be identified.

It was identified that the multi-acid anionic material-carbon fiber composite obtained through four hours of calcination as in embodiment 2 presented a one-dimensional nanofiber structure partially having a rough surface and that amorphous carbon nanofibers and multi-acid anionic crystals both are present in the one-dimensional nanofibers.

It was identified that the multi-acid anionic material-carbon fiber composite obtained through six hours of calcination as in embodiment 1 have the structure that round multi-acid anionic material crystals are irregularly stuck into smooth one-dimensional carbon nanofibers.

Figure 3:
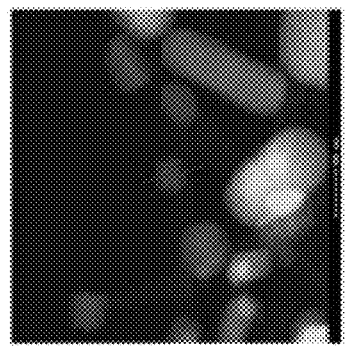
FIG. 3 is a view illustrating a result of line scan qualitative analysis on a result of component analysis of a multi-acid anionic material-carbon fiber composite prepared by a preparing method through scan transmission electron microscopy and an energy-dispersive light splitter, according to an embodiment of the present disclosure.
Figure 3:
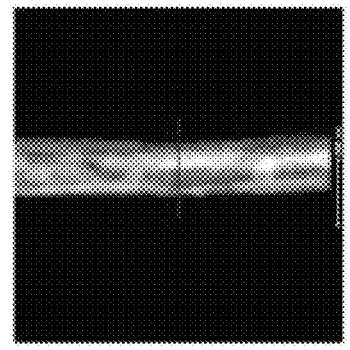
Figure 3:
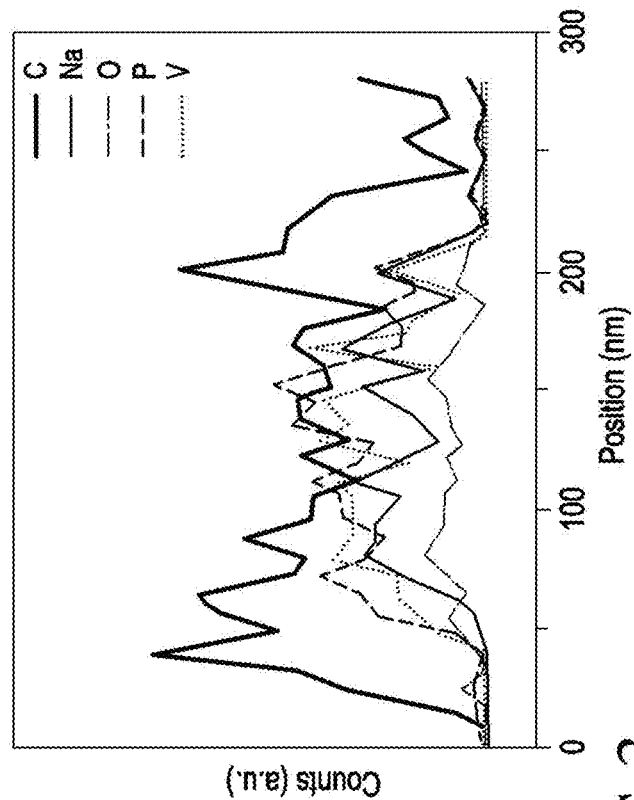
Figure 3:
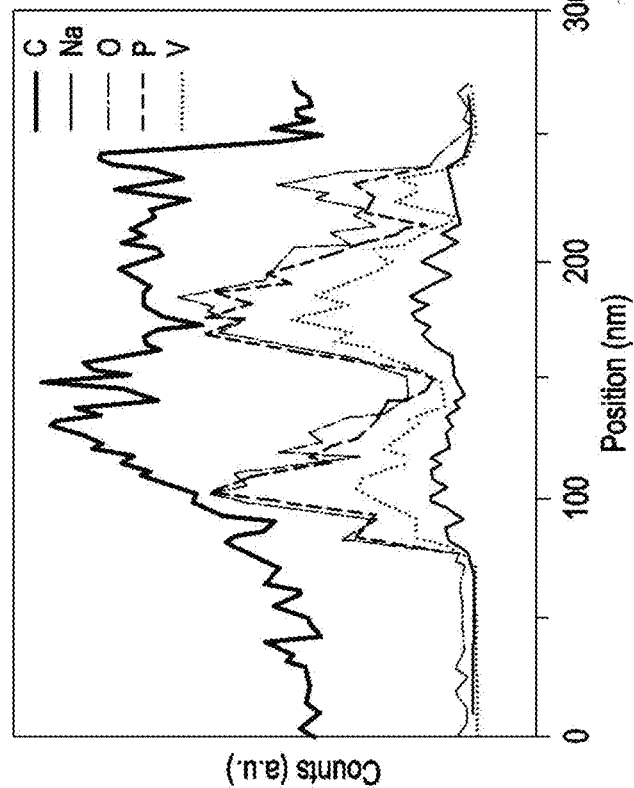

Experimental Example 3: Energy-Dispersive Light Splitter and Qualitative Analysis Results of component analysis on the multi-acid anionic material-carbon fiber composites prepared in embodiment 1 and embodiment 2 were shown in FIG. 3.

From the result of line scan qualitative analysis using scan transmission electron microscopy and an energy-dispersive light splitter, one-dimensional nanofibers prepared in embodiment 2 were shown to irregularly have carbon components and multi-acid anionic components therein, but the nanofibers obtained through six hours of calcination as in embodiment 1 were shown to be mostly formed of carbon components, with the particles stuck into the nanofibers present as multi-acid anionic components.

Experimental Example 4: Electrochemical Analysis

Electrochemical analysis was conducted using a half cell that was prepared using, as a cathode active material for a sodium ion battery, the multi-acid anionic material-carbon fiber composites prepared in embodiment 1 and embodiment 2, and results were shown in FIGS. 4A to 4D.

Figure 4A:
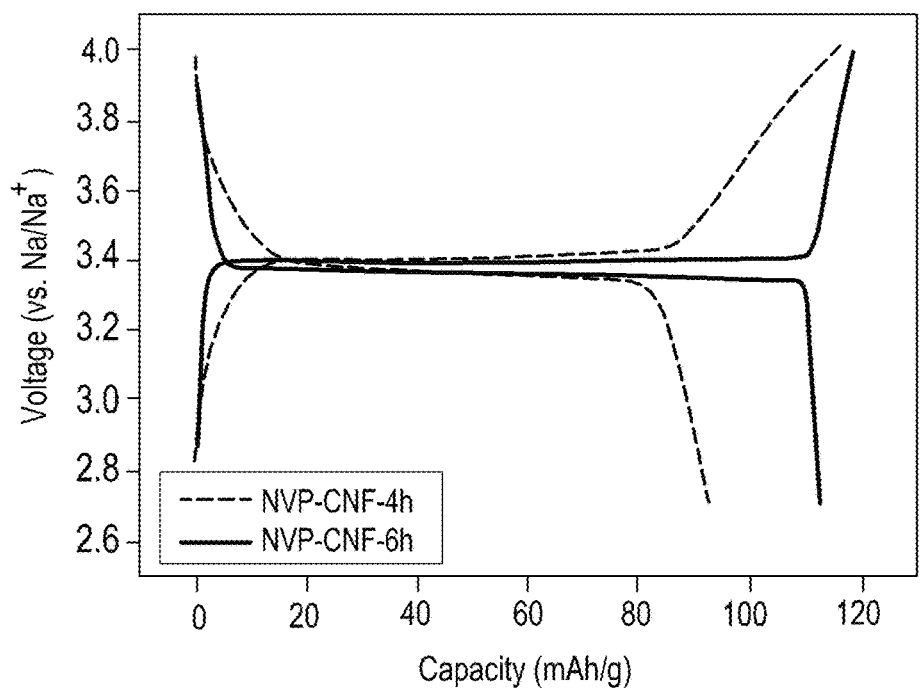
FIGS. 4A through 4D are graphs illustrating results of electrochemical analysis on a half cell manufactured using, as a cathode active material, a multi-acid anionic material-carbon fiber composite prepared by a preparing method according to an embodiment of the present disclosure.

The half cell was charged and discharged using a voltage of 2.7V to 4V and a C-rate of C/10, and the result of measuring charge/discharge characteristics was shown in FIG. 4A. As evident, from FIG. 4A, it could be identified that the half cell prepared using, as a cathode active material for a sodium ion battery, the multi-acid anionic material-carbon fiber composite prepared in embodiment 1 where the calcination was performed for six hours had better charge/discharge characteristics than the multi-acid anionic material-carbon fiber composite prepared in embodiment 2.

Figure 4B:
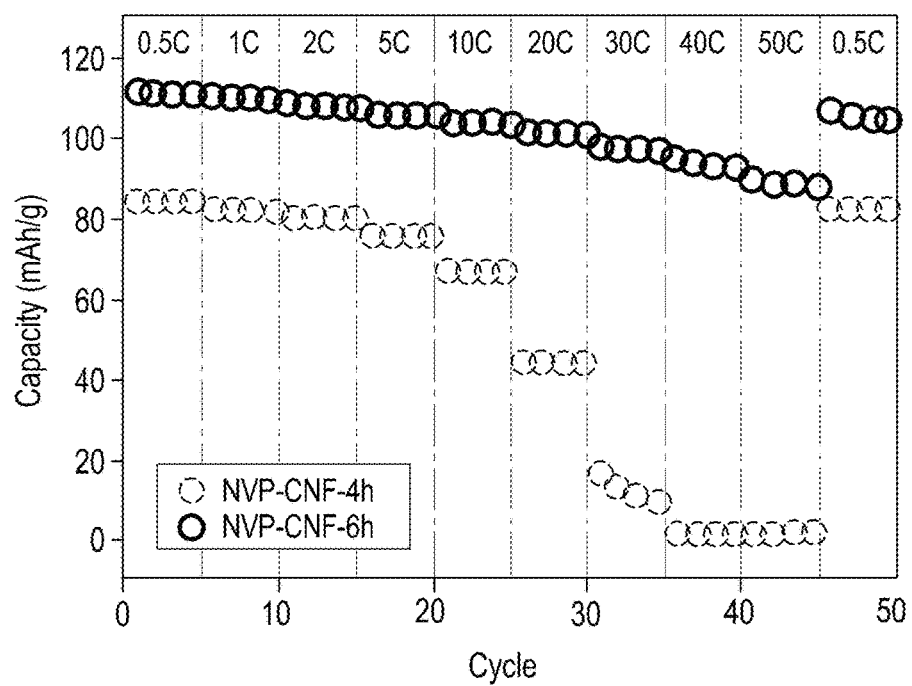
Figure 4C:
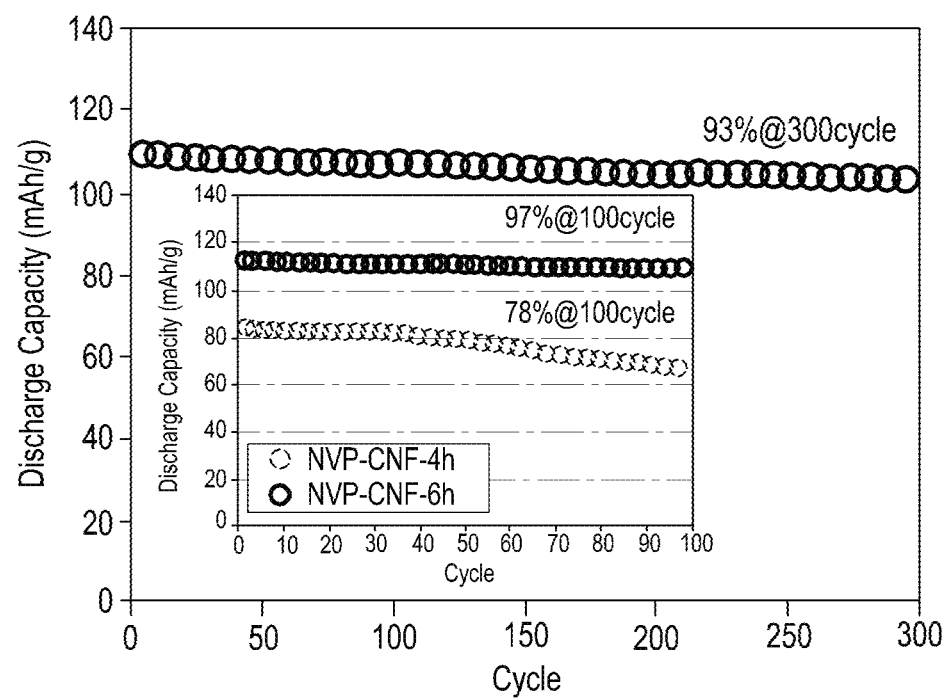

The half cell was measured for its characteristics while varying the C-rate from 0.5 C to 50 C at 2.7V to 4V, and the result was shown in FIG. 4B.

The half cell using, as a cathode active material, the multi-acid anionic material-carbon fiber composite prepared in embodiment 1 exhibited a small reduction in capacity even when the charge/discharge speed increased and maintained a capacity of 89 mAh/g even at a high C-rate of 50 C, which is 79% of that at 0.5 C, whereas the half cell using the multi-acid anionic material-carbon fiber composite prepared in embodiment 2 presented a sharp decrease in capacity as the charge/discharge speed increased.

To assess cycle characteristics of the half cell, charge and discharge were performed at 1 C, and the result was shown in FIG. 3C.

The half cell using, as a cathode active material, the multi-acid anionic material-carbon fiber composite prepared in embodiment 2, presented a capacity of about 78% at 100 cycles when charge and discharge were performed at 1 C whereas the half cell using, as a cathode active material, the multi-acid anionic material-carbon fiber composite prepared in embodiment 1 maintained a capacity of about 93% even at 300 cycles when charge and discharge were conducted under substantially the same condition and thus presented an enhanced lifecycle.

Figure 4D:
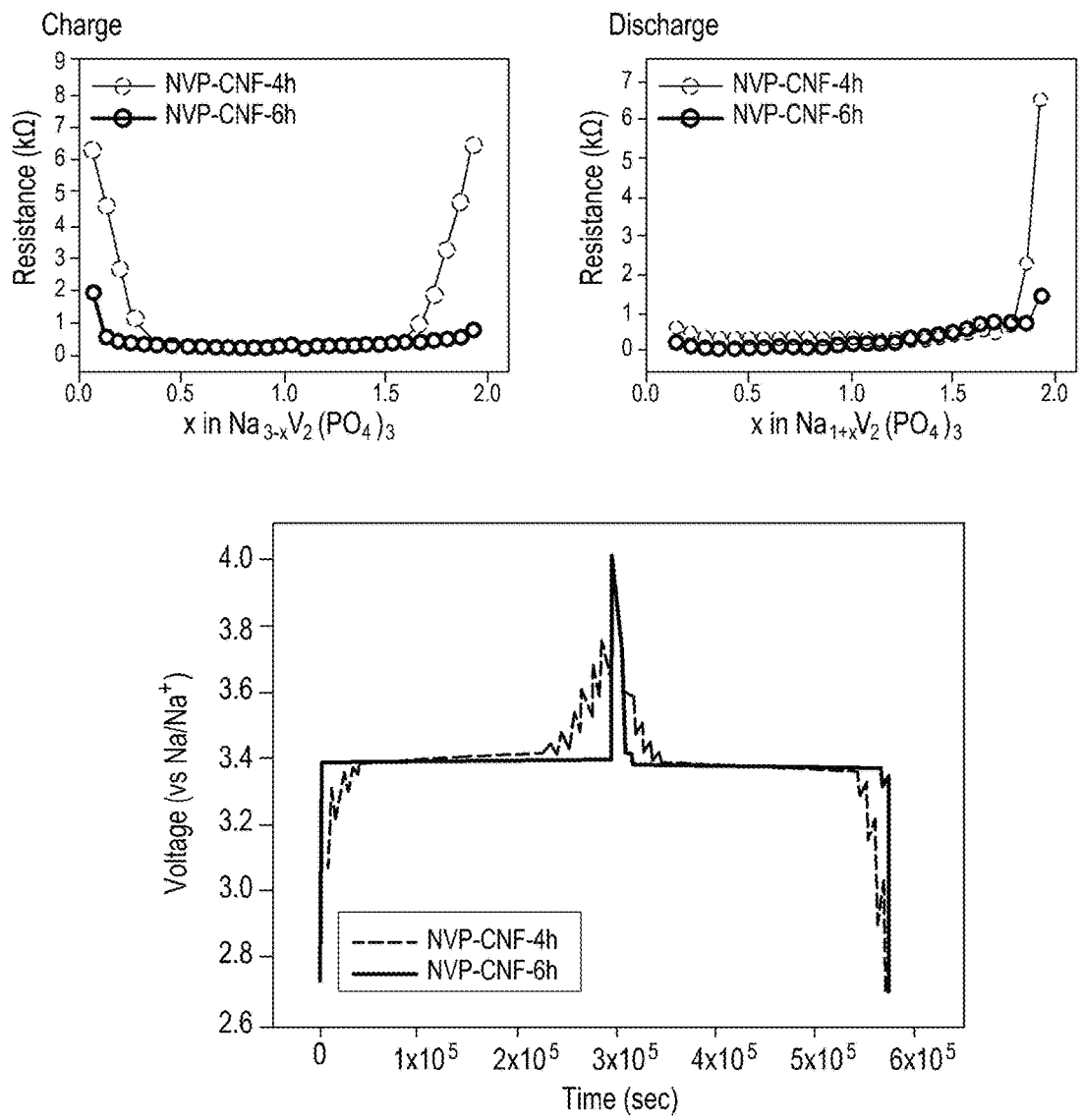

To figure out the characteristics in form of the cathode active materials used in the half cell according to the time of calcination and measure sodium mobility in the structure, the Galvanostatic Intermittent Titration Technique (GITT) was conducted, and the result was shown in FIG. 4D.

As evident from FIG. 4D, it could be identified that the half cell using, as a cathode active material, the multi-acid anionic material-carbon fiber composite prepared in embodiment 1 presented good characteristics, and the good characteristics could be rendered to be associated with sodium mobility in the structure.

According to the result of sodium spreading resistance computed through the GITT, it could be identified that a lower resistance as per charge/discharge states was obtained by embodiment 1 where the calcination was conducted for six hours than by embodiment 2 where the calcination was conducted for four hours.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. A multi-acid anionic material-carbon fiber composite, comprising:
    carbon nanofibers;
    multi-acid anionic crystals stuck in the carbon nanofibers, wherein a part of each of the multi-acid anionic crystals is embedded in the carbon nanofibers, and the remaining part of each of the multi-acid anionic crystals is exposed to an outside of the carbon nanofibers,
    wherein 5 to 20 parts by weight of the carbon nanofibers are included relative to 100 parts by weight of the multi-acid anionic crystals, and
    wherein the multi-acid anionic crystals are sodium vanadium phosphate crystals.

* * * * *